(12) United States Patent
Anzai (10) Patent No.: US 10,845,180 B2
(45) Date of Patent: Nov. 24, 2020

(54) MEASUREMENT APPARATUS AND METHOD FOR MEASURING COORDINATES OF COLUMNAR WORKPIECE

(71) Applicant: MITUTOYO CORPORATION, Kanagawa (JP)

(72) Inventor: Hirotada Anzai, Schaumburg, IL (US)

(73) Assignee: MITUTOYO CORPORATION, Kawasaki (JP)

( * ) Notice: Subject to any disclaimer, the term of this patent is extended or adjusted under 35 U.S.C. 154(b) by 181 days.

(21) Appl. No.: 16/224,011

(22) Filed: Dec. 18, 2018

(65) Prior Publication Data

US 2020/0191542 A1 Jun. 18, 2020

(51) Int. Cl.
*G01B 5/008* (2006.01)
*G01B 5/012* (2006.01)
*G01B 5/00* (2006.01)

(52) U.S. Cl.
CPC .............. *G01B 5/012* (2013.01); *G01B 5/003* (2013.01)

(58) Field of Classification Search
CPC .................................................... G01B 5/008
USPC ........................................................... 33/503
See application file for complete search history.

(56) References Cited

U.S. PATENT DOCUMENTS

| 9,810,516 | B2* | 11/2017 | Anzai | G01B 21/047 |
| 10,001,356 | B2* | 6/2018 | Tanaka | G01B 5/008 |
| 2013/0300861 | A1* | 11/2013 | Neumann | G01B 5/012 |
| | | | | 348/135 |
| 2015/0292852 | A1* | 10/2015 | Oki | G01B 5/008 |
| | | | | 33/502 |
| 2016/0258734 | A1* | 9/2016 | Anzai | G01B 21/047 |
| 2017/0234670 | A1* | 8/2017 | Fernando | G01B 5/28 |
| | | | | 33/503 |
| 2017/0341192 | A1* | 11/2017 | Fukuda | B23Q 3/064 |

FOREIGN PATENT DOCUMENTS

JP 2015-081878 A 4/2015

* cited by examiner

*Primary Examiner* — George B Bennett
(74) *Attorney, Agent, or Firm* — Rankin, Hill & Clark LLP (57) ABSTRACT

A measurement apparatus includes: the first end supporter; the second end supporter; a probe that measures a columnar workpiece supported by the first end supporter and the second end supporter; and a control part that obtains a center and a rotation track of the first end supporter, and a center of the second end supporter when a rotary table rotates and changes the orientation of workpiece coordinate axes based on a rotation position of the rotary table when a measurement of the columnar workpiece by the probe is performed, the workpiece coordinate axes including an axis passing through the center of the first end supporter and the center of the second end supporter.

14 Claims, 9 Drawing Sheets

MEASUREMENT APPARATUS AND METHOD FOR MEASURING COORDINATES OF COLUMNAR WORKPIECE

BACKGROUND

The present invention relates to a measurement apparatus for measuring coordinates of a columnar workpiece and a method for measuring coordinates of the columnar workpiece.

Measurement apparatuses that measure coordinates and the like of an elongated columnar workpiece are known. For example, a measurement apparatus disclosed in a Patent Document 1, Japanese Unexamined Patent Publication No. 2015-081878, measures three-dimensional (3D) coordinates of the columnar workpiece with a probe by rotating a rotary table while a lower-end support part provided on a rotary table supports a bottom end portion of the columnar workpiece and an upper-end support part supports a top end portion of the columnar workpiece.

Since the columnar workpiece supported at its top and bottom may be inclined with respect to a rotation axis of the rotary table, in Patent Document 1, the inclination of the columnar workpiece is detected by obtaining the center of a sphere of the lower-end support part and the upper-end support part each time the rotary table stops at a measurement position to perform a measurement. As such, in a technique of Patent Document 1, it takes time for the detection to be performed before the measurement starts because the center of the sphere needs to be detected each time the rotary table stops at the measurement position.

SUMMARY

This invention focuses on this point, and an object of the present invention is to properly measure a columnar workpiece supported at both ends in the axial direction, during the rotation, even if the columnar workpiece is inclined.

In one aspect of the present invention, a measurement apparatus including the first end supporter that is provided on a rotary table and supports the first end of a columnar workpiece in an axial direction; the second end supporter that is separated from the rotary table and supports the second end of the columnar workpiece in the axial direction; a probe that measures the columnar workpiece supported by the first end supporter and the second end supporter; and a control part that obtains a center and a rotation track of the first end supporter and a center of the second end supporter when the rotary table rotates, and changes the orientation of workpiece coordinate axes based on a rotation position of the rotary table when a measurement of the columnar workpiece by the probe is performed, the workpiece coordinate axes including an axis passing through the center of the first end supporter and the center of the second end supporter is provided.

In another aspect of the present invention, a method for measuring coordinates of a columnar workpiece including: rotating a rotary table in a state where the first end of the columnar workpiece in an axial direction is supported by the first end supporter provide on the rotary table and the second end of the columnar workpiece in the axial direction is supported by the second end supporter separated from the rotary table; obtaining a center and a rotation track of the first end supporter, and a center of the second end supporter when the rotary table rotates; and changing the orientation of workpiece coordinate axes based on a rotation position of the rotary table when a measurement of the columnar workpiece with a probe is performed, the workpiece coordinate axes including an axis passing through the center of the first end supporter and the center of the second end supporter is provided.

DETAILED DESCRIPTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<Configuration of a Measurement Apparatus>

Figure 1:
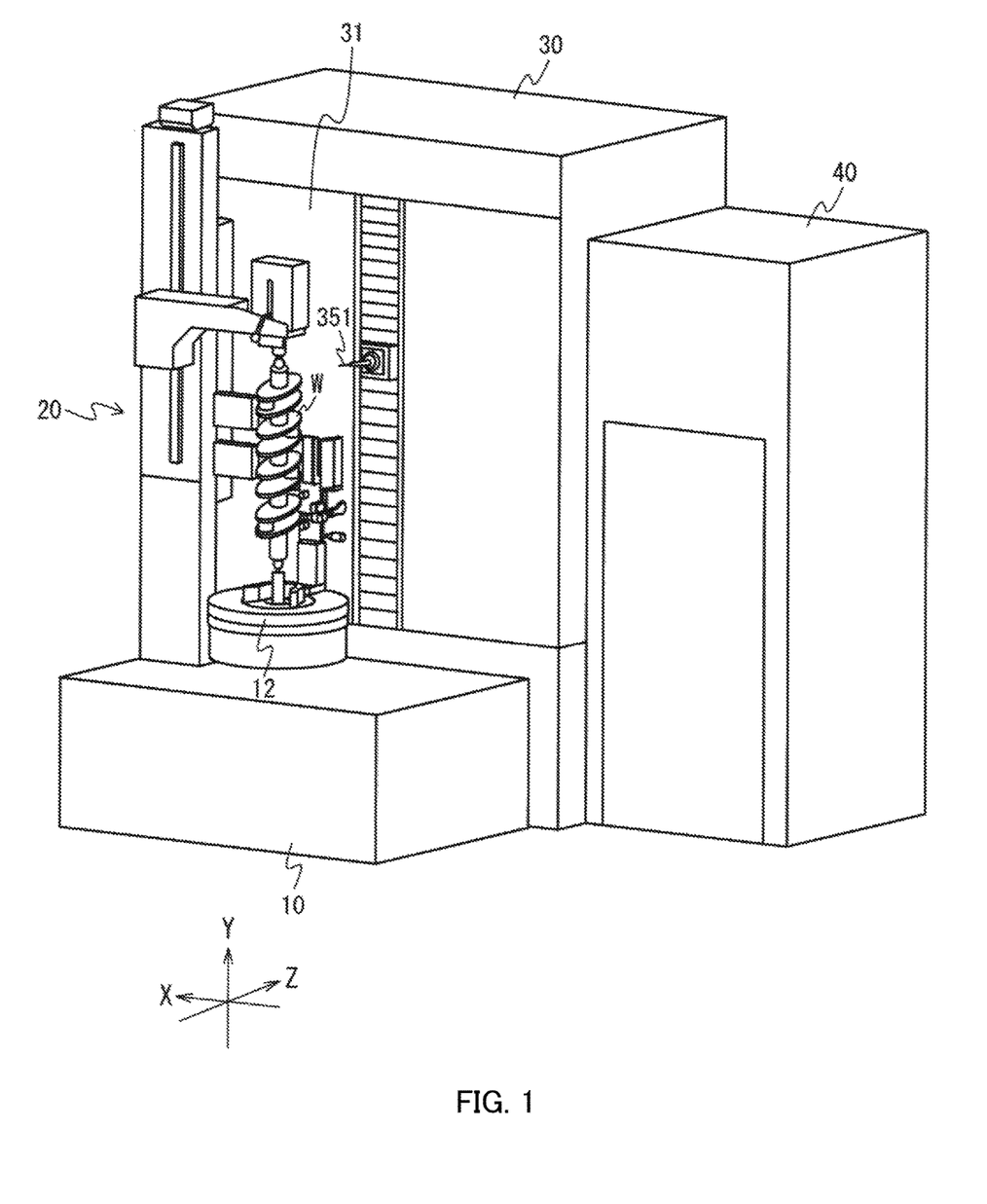
FIG. 1 is a perspective view showing an external configuration of a measurement apparatus 1 according to an embodiment of the present invention.
Figure 2:
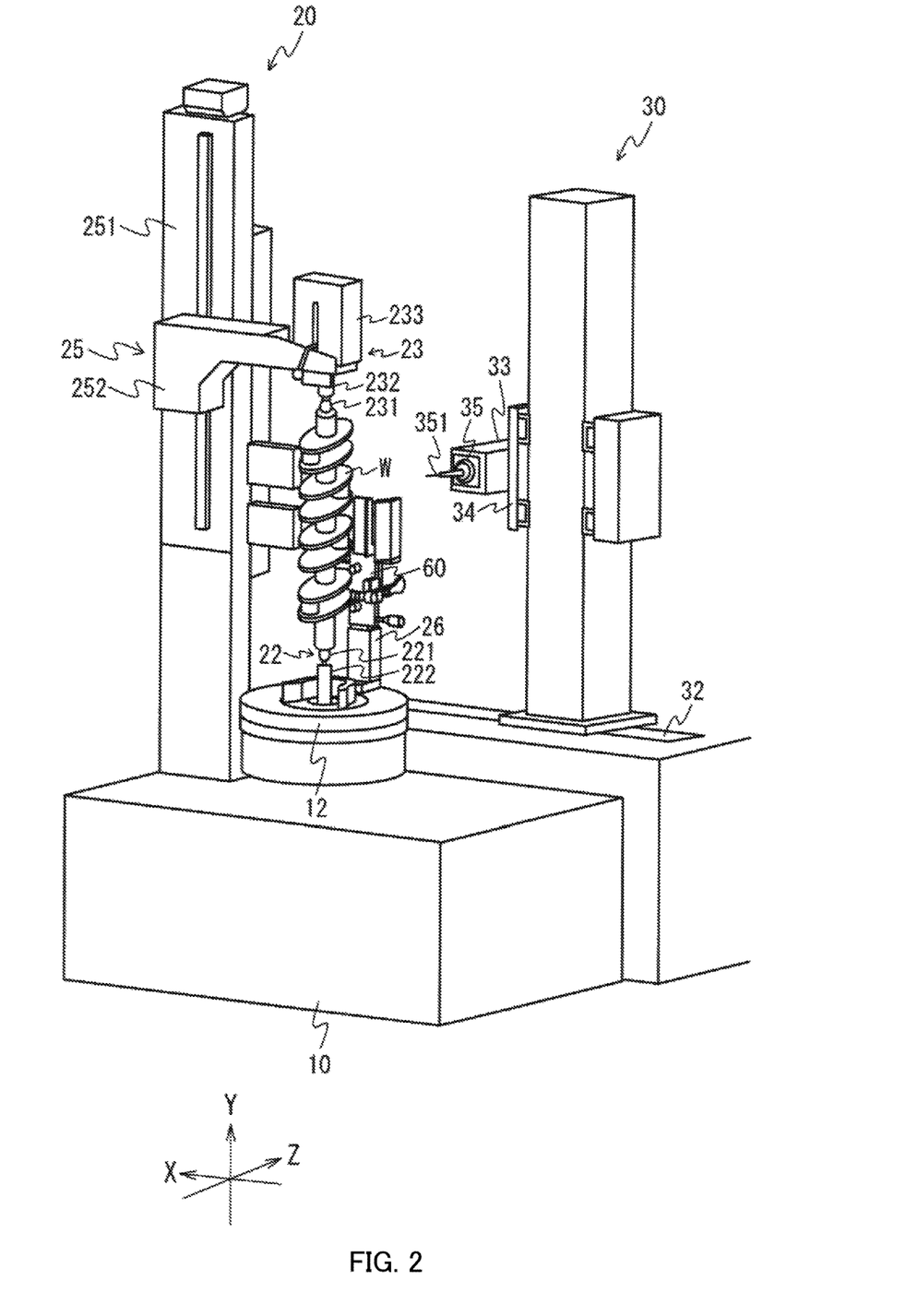
FIG. 2 is a perspective view showing a coordinate measuring machine (CMM) 30 without a casing 31 and a support mechanism 20.

With reference to FIGS. 1 and 2, a configuration of a measurement apparatus 1 according to an embodiment of the present invention is described.

FIG. 1 is a perspective view illustrating an external configuration of the measurement apparatus 1 according to one embodiment. FIG. 2 is a perspective view illustrating (i) a coordinate measuring machine (CMM) 30 without a casing 31 and (ii) a support mechanism 20. As shown in FIG. 1, the measurement apparatus 1 includes a base 10, the support mechanism 20, the CMM 30, and a control apparatus 40.

The measurement apparatus 1 measures coordinates and the like of a columnar workpiece W using the CMM 30 in a state where the columnar workpiece W is supported by the support mechanism 20. The measurement apparatus 1 performs measurement while moving a probe 351 relative to the columnar workpiece W supported by the support mechanism 20.

The base 10 supports the support mechanism 20 and the CMM 30. The base 10 is installed such that, when the measurement apparatus 1 rests on the floor, a top surface thereof is horizontal.

A rotary table 12 is a table provided above the base 10. The rotary table 12 is driven by a rotation driver (not shown) and rotates around a center axis (rotation axis) along a perpendicular direction (Z-axis direction). For example, the measurement apparatus 1 measures the columnar workpiece W while moving the probe 351, in a state where the rotary table 12 is rotated by a predetermined amount and stopped at a measurement position. By having the rotary table 12 rotate and stop at a plurality of measurement positions, the coordinates and the like of the entire columnar workpiece W are measured.

The support mechanism 20 supports two ends of the columnar workpiece W in the axial direction. The support mechanism 20 supports the columnar workpiece W in a vertically oriented state (i.e. a state where the axial direction of the columnar workpiece W is parallel to the perpendicular direction). Here, the columnar workpiece W is, for example, a crank shaft or a cam shaft of a vehicle engine. It should be noted that the support mechanism 20 will be described in detail below.

The CMM 30 measures the coordinates and the like of the columnar workpiece W supported by the support mechanism 20. The CMM 30 is arranged in a lateral direction of the columnar workpiece W that is supported vertically (i.e. a direction orthogonal to the axial direction of the columnar workpiece W). The CMM 30 is a lateral CMM that measures the coordinates of the columnar workpiece W by bringing the probe 351 close to the columnar workpiece W from a lateral direction of the columnar workpiece W. As shown in FIG. 2, the CMM 30 includes an X-axis moving mechanism 32, a Y-axis moving mechanism 34, a Z-axis moving mechanism 33, and a probe head 35.

The X-axis moving mechanism 32 moves the probe head 35 along an X-axis direction, the Y-axis moving mechanism 34 moves the probe head 35 along a Y-axis direction, and the Z-axis moving mechanism 33 moves the probe head 35 along the Z-axis direction. The X-axis moving mechanism 32, the Y-axis moving mechanism 34, and the Z-axis moving mechanism 33 include, for example, a belt and a feed screw mechanism.

The probe head 35 is provided on the Z-axis moving mechanism 33. The probe head 35 is moved in the directions of three mutually orthogonal axes (X-axis direction, Y-axis direction, and Z-axis direction) by the X-axis moving mechanism 32, Y-axis moving mechanism 34, and Z-axis moving mechanism 33. The probe 351 is detachably mounted to a tip of the probe head 35.

The probe 351 measures the columnar workpiece W while moving along the X-axis direction, Y-axis direction, and Z-axis direction. For example, the probe 351 measures the columnar workpiece W which rotates simultaneously with the rotation of the rotary table 12. In this example, the probe 351 is a contact-type probe performing a measurement by contacting the columnar workpiece W, but the probe 351 is not limited to this, and the probe 351 may also be a non-contact type probe, for example. The measurement apparatus 1 has probes in various shapes used as the probe 351, and the probes 351 can be replaced depending on a measurement portion of the columnar workpiece W. In addition, the tip of the probe 351 may be configured to be freely moved by the probe head 35.

The control apparatus 40 controls the overall operation of the measurement apparatus 1. The control apparatus 40 measures the columnar workpiece W supported by the support mechanism 20 by controlling the rotation of rotary table 12 and the movement of the CMM 30 (specifically, the probe 351).

<Detailed Configuration of the Support Mechanism 20>

With reference to FIG. 2, a detailed configuration of the support mechanism 20 that supports the columnar workpiece W is described. The support mechanism 20 includes, as shown in FIG. 2, a lower support part 22, an upper support part 23, a Y direction coarse movement mechanism 25, and a post part 26. The columnar workpiece W rotates, simultaneously with the rotation of the rotary table 12, in a state where the columnar workpiece W is supported by the lower support part 22 and the upper support part 23.

The lower support part 22 supports the first end (specifically, a bottom end portion) of the columnar workpiece W in the axial direction. The lower support part 22 is provided on the rotary table 12 and rotates integrally with the rotary table 12. Therefore, the columnar workpiece W supported by the lower support part 22 also rotates integrally with the rotary table 12. The lower support part 22 includes a lower supporter 221 and a lower chuck 222.

The lower supporter 221 is the first end side supporter that makes contact with a recess formed on the lower end surface of the columnar workpiece W and supports a lower side of the columnar workpiece W. The lower supporter 221 is a sphere in this example, and the center of the lower supporter 221 is positioned on the rotary table 12 (on the rotation axis of the rotary table 12, for example). A shaft is coupled to the lower supporter 221.

The lower chuck 222 is a rod-shaped member provided on the rotary table 12. The lower chuck 222 has a hole in its center, and the shaft of the lower supporter 221 is detachably inserted through the hole. Accordingly, the lower supporter 221 can be replaced depending on the columnar workpiece W.

The upper support part 23 is separated from the rotary table 12 and supports the second end of the columnar workpiece W in the axial direction (specifically, a top end portion). The upper support part 23, unlike the lower support part 22, does not rotate when the rotary table 12 rotates because a pressing part 233 included in the upper support part 23 is fixed to the Y direction coarse movement mechanism 25 as described below. The upper support part 23 includes an upper supporter 231, an upper chuck 232, and the pressing part 233.

The upper supporter 231 is the second end supporter that makes contact with a recess formed on the upper end surface of the columnar workpiece W and supports an upper side of the columnar workpiece W. The upper supporter 231 is a sphere in this example and is rotatably supported on a shaft part (shaft).

The upper chuck 232 is a rod-shaped member fixed to a slider of the pressing part 233. The upper chuck 232 has a hole in its center, and the shaft of the upper supporter 231 is detachably inserted through the hole. For this reason, the shaft supporting the upper supporter 231 does not rotate when the columnar workpiece W rotates. However, the present invention is not limited to the above, and the shaft may rotate together with the columnar workpiece W.

The pressing part 233 presses the top end of the columnar workpiece W downward. By this, the supported state of the columnar workpiece W is maintained. The pressing part 233 is fixed to a slider 252 of the Y direction coarse movement mechanism 25.

The Y direction coarse movement mechanism 25 is a mechanism for moving the pressing part 233 in the Y direction according to the length of the columnar workpiece W in the axial direction. This enables the pressing part 233 to move to a position directly above the columnar workpiece W. The Y direction coarse movement mechanism 25 includes a column 251 and the slider 252.

The column 251 is supported by the base 10 so as to be parallel to the columnar workpiece W, which is supported in the vertical direction. The slider 252 is provided to be able to slidably move along the column 251 in the Y direction.

The post part 26 is provided on the rotary table 12. The post part 26 is a block body provided along the Y axis direction. The first end of the post part 26 is fixed to the rotary table 12.

In the above described support mechanism of the columnar workpiece W, the columnar workpiece W supported by the lower support part 22 and the upper support part 23 may be inclined with respect to the rotation axis of the rotary table 12. If the columnar workpiece W is inclined with respect to the rotation axis in such a manner, the posture of the columnar workpiece W changes when performing a measurement with the probe 351 while rotating the rotary table 12, and therefore a measurement error occurs.

Figure 3:
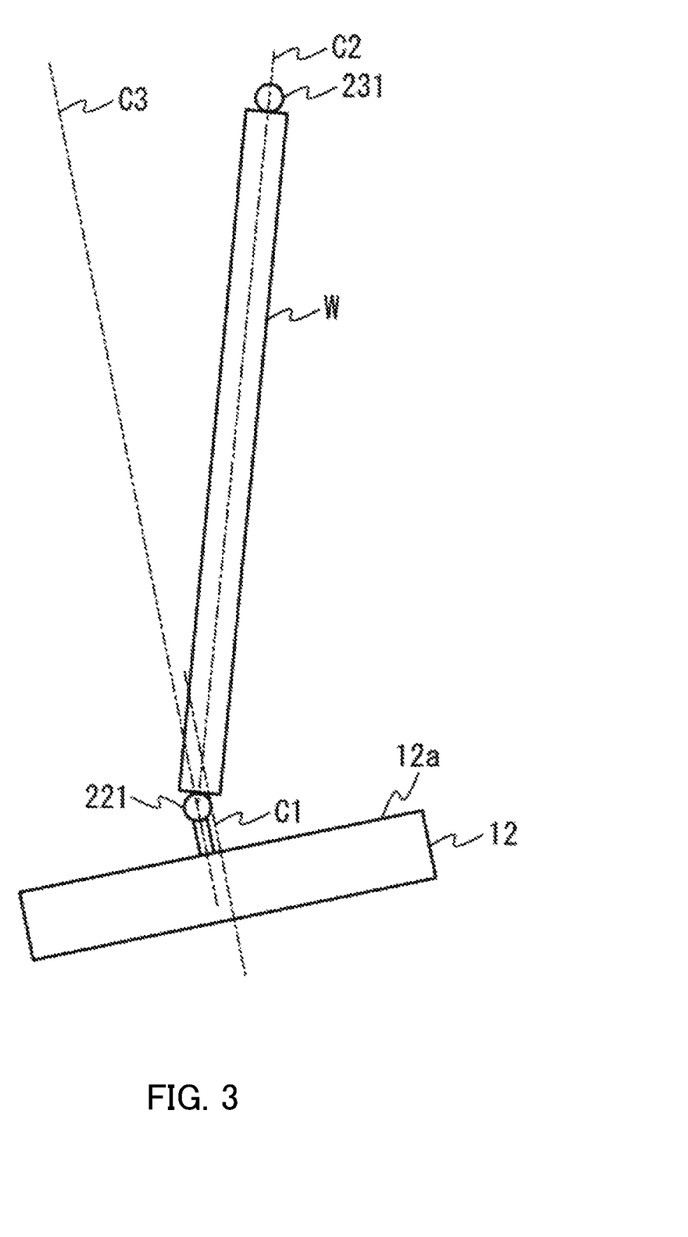
FIG. 3 is a schematic diagram showing a state where a columnar workpiece W is inclined with respect to a rotary table 12.

FIG. 3 is a schematic diagram showing a state where the columnar workpiece W is inclined with respect to the rotary table 12. In order to help understand the state where the columnar workpiece W is inclined, FIG. 3 shows the state of inclination being greater than it actually is. Also, hereinafter, the lower supporter 221 is assumed to be slightly separated from a rotation axis C1 of the rotary table 12. As is obvious from FIG. 3, in the state where the columnar workpiece W is inclined, a center vector C2 connecting the centers of the lower supporter 221 and the upper supporter 231 intersects with the rotation axis C1 of the rotary table 12. The causes for such intersection can be presumed to be, for example, a case where a surface of rotation 12a of the rotary table 12 itself is inclined, a case where the lower supporter 221 and the upper supporter 231 are misaligned, and the like.

If the axial direction of the columnar workpiece W does not coincide with that of the rotary table 12, as shown in FIG. 3, the center of the upper supporter 231 deviates from a perpendicular line C3 which runs through the center of the lower supporter 221 from the surface of rotation 12a of the rotary table 12. For this reason, if the movement of the columnar workpiece W is viewed from the surface of rotation 12a when the rotary table 12 is rotating, the top end of the columnar workpiece W appears to twirl as shown in FIG. 4.

Figure 4:
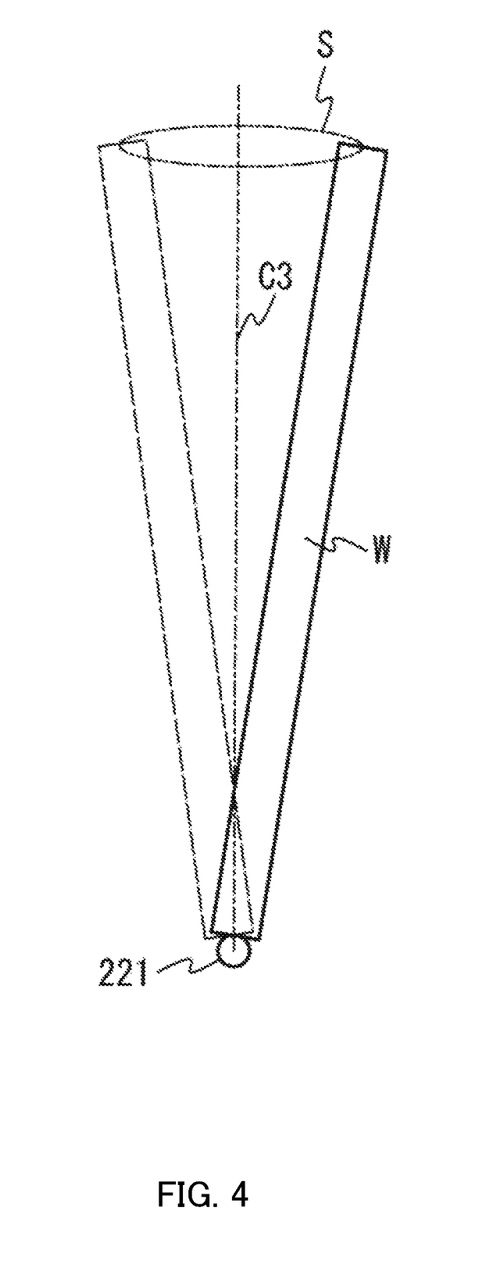
FIG. 4 is a schematic diagram for illustrating change of posture of the columnar workpiece W.

FIG. 4 is a schematic diagram for illustrating change of the posture of the columnar workpiece W. In FIG. 4, the two-dot chain line indicates a rotation track S of the top end of the columnar workpiece W viewed from the surface of rotation 12a while the rotary table 12 is rotating. The columnar workpiece W rotates along an outer peripheral surface of an inverse cone formed by connecting the rotation track S and the center of the lower supporter 221. That is, the posture of the columnar workpiece W changes according to a rotation angle (rotation position) of the rotary table 12. It should be noted that if the rotation axis C1 of the rotary table 12 deviates from the perpendicular line C3 as shown in FIG. 3, the rotation track S of the top end of the columnar workpiece W takes on an elliptical shape in which a deviation amount is added to the diameter of a circle indicated by the two-dot chain line in FIG. 4.

When the posture of the columnar workpiece W changes according to the rotation position of the rotary table 12 as described above, errors in measurement values along the X-axis, Y-axis, and Z-axis (also referred to as coordinate axes of the apparatus) measured by the probe 351 would eventually occur. In particular, the greater the length of the columnar workpiece W in the axial direction (the farther from the center of the lower supporter 221), the greater the error in a measurement value tends to be. Meanwhile, the measurement apparatus 1 (specifically, the control apparatus 40) of the present embodiment, as will be described in detail below, generates workpiece coordinate axes of the columnar workpiece W and moves the generated workpiece coordinate axes according to the rotation position of the rotary table 12. Then, the measurement apparatus 1 converts the measurement values on the coordinate axes of the apparatus measured by the probe 351 into values on the workpiece coordinate axes. Accordingly, even if the posture of the columnar workpiece W changes, the occurrence of a measurement error can be suppressed by obtaining the measurement value converted to the workpiece coordinate axes. Consequently, the columnar workpiece W can be measured with high accuracy.

<Detailed Configuration of a Control Apparatus>

Figure 5:
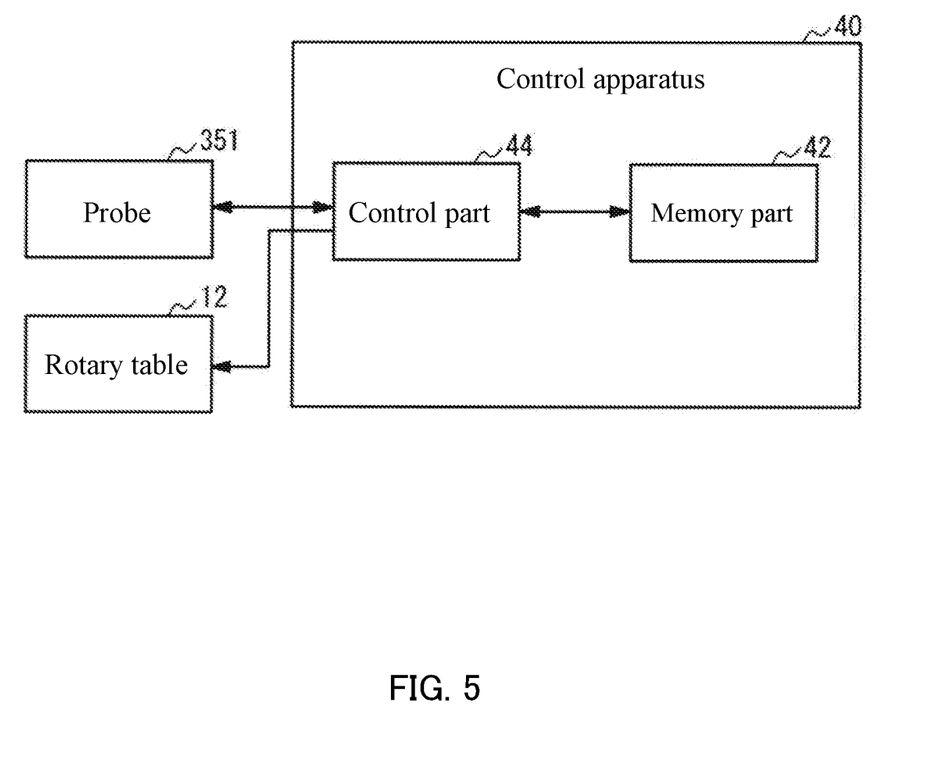
FIG. 5 is a block diagram for illustrating an example of a configuration of a control apparatus 40.

With reference to FIG. 5, detailed configuration of a control apparatus 40 is described. FIG. 5 is a block diagram for illustrating an example of a configuration of the control apparatus 40. As shown in FIG. 5, the control apparatus 40 includes a memory part 42 and a control part 44.

The memory part 42 includes, for example, a read only memory (ROM) and a random access memory (RAM). The memory part 42 stores programs and various data to be executed by the control part 44. For example, the memory part 42 stores information related to a rotation track (rotation track of FIG. 4) of the lower supporter 221 when the rotary table 12 is rotating. Also, the memory part 42 may store information related to a degree of inclination of the rotary table 12.

The control part 44 is a central processing unit (CPU), for example. The control part 44 controls operation of the measurement apparatus 1 by executing a program stored in the memory part 42. For example, the control part 44 controls the rotation of the rotary table 12 and the movement of the probe 351. It should be noted that the rotation of the rotary table 12 and the movement of the probe 351 may be performed by a control part (not shown) provided on the measurement apparatus 1.

The control part 44 controls the measurement, by the probe 351, of the columnar workpiece W supported by the support mechanism 20. In the present embodiment, the control part 44 has a function of a coordinate generation part that generates workpiece coordinate axes in order to obtain a measurement value of the columnar workpiece W with high accuracy.

Figure 6:
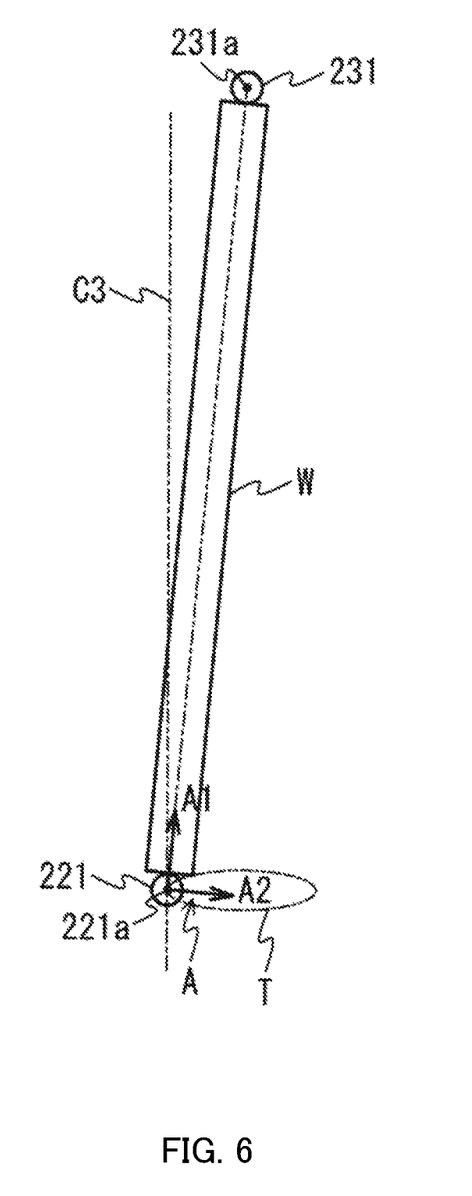
FIG. 6 is a schematic diagram for illustrating workpiece coordinate axes A.

FIG. 6 is a schematic diagram for illustrating a workpiece coordinate axes A. In FIG. 6, a rotation track T of the center 221a of the lower supporter 221 that deviates from the rotation axis of the rotary table 12 when the rotary table 12 is rotating is indicated by the two-dot chain line. Unlike the X-axis, Y-axis, and Z-axis (coordinate axes of the apparatus) of the measurement apparatus 1, the workpiece coordinate axes A correspond to coordinate axes that include an axis along the axial direction of the columnar workpiece W. The workpiece coordinate axes A include three axes orthogonal to each other, for example, and the origin of the coordinate axes is the center 221a of the lower supporter 221. The workpiece coordinate axes A contain the first axis A1, the second axis A2, and the third axis A3 (the axis in the depth direction of FIG. 6). The first axis A1 is an axis parallel to the columnar workpiece W in the axial direction and positioned on the line connecting the center 221a of the lower supporter 221 and the center 231a of the upper supporter 231. The second axis A2 and the third axis A3 are orthogonal to the first axis A1.

The control part 44 converts measurement values on the coordinate axes of the apparatus measured by the probe 351 into values on the workpiece coordinate axes A, and obtains the converted values on the workpiece coordinate axes A as the corrected measurement values of the columnar workpiece W. By obtaining the corrected measurement values of the workpiece coordinate axes A in this manner, the columnar workpiece W can be measured with high accuracy even if the posture of the supported columnar workpiece W changes along with the rotation of the rotary table 12 as shown in FIG. 4, for example.

Before the columnar workpiece W is set, the control part 44 obtains the rotation track (rotation track T of FIG. 6) of the center 221a of the lower supporter 221 corresponding to the rotation angle of the rotary table 12 by measuring, with the probe 351, the center 221a of the lower supporter 221 when the rotary table 12 is rotating. If a position of the center 221a of the lower supporter 221 deviates from the rotation axis C1 (FIG. 3) of the rotary table 12, the center 221a also rotates in a manner to trace a circle, for example. The control part 44 causes the memory part 42 to store information related to the obtained rotation track of the center 221a of the lower supporter 221. This eliminates, henceforth, the necessity of obtaining the rotation track by measuring the center 221a of the lower supporter 221.

Before the columnar workpiece W is set and the measurement starts, the control part 44 measures the center 231a of the upper supporter 231 with the probe 351. This is because the position of the center 231a of the upper supporter 231 varies according to the length of the columnar workpiece W, which is to be set to the measurement apparatus 1, in the axial direction. Therefore, the control part 44 measures the center 231a of the upper supporter 231 each time the columnar workpiece W is set.

The control part 44 generates the above-mentioned workpiece coordinate axes A based on the center 221a of the lower supporter 221 and the center 231a of the upper supporter 231. Then, the control part 44 changes the orientation of the workpiece coordinate axes A based on the rotation track of the lower supporter 221 and the position of the upper supporter 231 when measuring the columnar workpiece W. That is, the control part 44 changes the orientation of the workpiece coordinate axes A according to the rotation position of the rotary table 12 when measuring the columnar workpiece W with the probe 351. Specifically, the control part 44 rotates the workpiece coordinate axes A while positioning the origin on the rotation track (rotation track T of FIG. 6) according to the rotation position of the rotary table 12. In other words, the control part 44 rotates the workpiece coordinate axes A, in conformity with the measurement position of the rotary table 12 after the rotation, so that the origin moves on the rotation track. Accordingly, the workpiece coordinate axes A can be set in accordance with the posture of the columnar workpiece W, and therefore the coordinates of the workpiece coordinate axes A can be obtained properly.

The control part 44 changes the orientation of the workpiece coordinate axes A according to the rotation position of the rotary table 12 when the probe 351 measures the columnar workpiece W while rotating the rotary table 12. By this, the orientation of the workpiece coordinate axes A at each measurement position automatically changes even in a case where the rotary table 12 stops at a plurality of measurement positions to let the probe 351 perform measurement, and therefore the control part 44 can quickly measure the columnar workpiece W based on the workpiece coordinate axes A. In particular, if the rotation of rotary table 12 and the measurement of the probe 351 are repeated, the measurement time can be reduced because the orientation of the workpiece coordinate axes A automatically changes even though the positions of the lower supporter 221 and the upper supporter 231 are re-measured for every repetition.

In the above description, the shaft supporting the upper supporter 231 was fixed, but the configuration is not limited to this. For example, the shaft supporting the upper supporter 231 may rotate along with the rotation of the rotary table 12 (columnar workpiece W).

Figure 7:
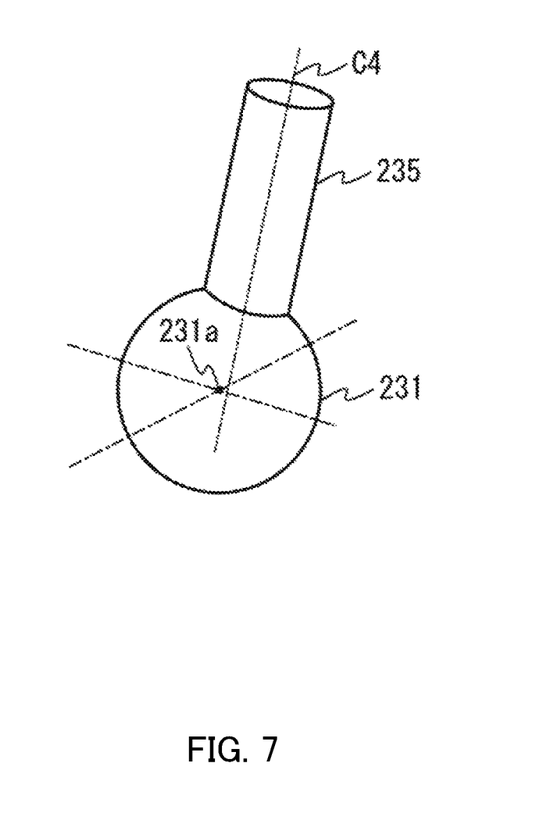
FIG. 7 is a schematic diagram for illustrating a configuration in which an upper supporter 231 and a shaft 235 rotate.

FIG. 7 is a schematic diagram for illustrating a configuration in which the center 231a of the upper supporter 231 and a shaft 235 which is the actual rotation axis rotate. In FIG. 7, it is assumed that the center 231a of the upper supporter 231 and a rotation axis C4 of the shaft 235 deviate from each other. If the center 231a of the upper supporter 231 and the rotation axis C4 of the shaft 235 deviate in such a manner, the position of the center of the upper supporter 231 would vary when the rotary table 12 rotates. In view of this, the control part 44 may correct a center position of the upper supporter 231 by measuring the upper supporter 231 and the shaft 235. For example, the control part 44 corrects the center position of the upper supporter 231 according to the rotation position of the rotary table 12. This makes it possible to reduce influences of the variation of the center position of the upper supporter 231 and the inclination of the rotation axis C4 due to the inclination of the columnar workpiece W. Consequently, the occurrence of measurement error of the columnar workpiece W can be more effectively suppressed.

<Operation Example of the Measurement Apparatus 1>

Figure 8:
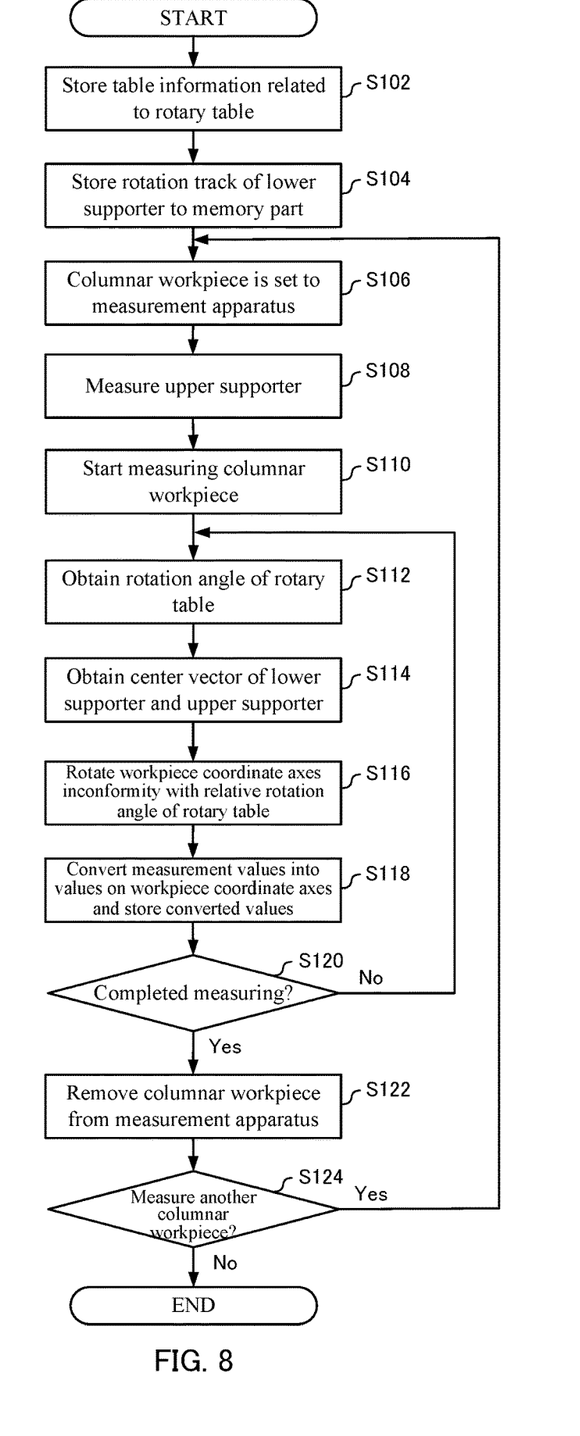
FIG. 8 is a flowchart for illustrating an operation example of the measurement apparatus 1 when measuring the columnar workpiece W.

With reference to FIG. 8, an operation example of the measurement apparatus 1 when measuring the columnar workpiece W is explained.

FIG. 8 is a flowchart for illustrating an operation example of the measurement apparatus 1 when measuring the columnar workpiece W. In the flowchart of FIG. 8, advance preparations (steps S102 to S104) are performed before measuring of the columnar workpiece W (specifically, before the columnar workpiece W is set).

In the advance preparations, the control part 44 causes the memory part 42 to store table information related to the rotary table 12 (step S102). A piece of information related to the inclination of the rotation axis C1 of the rotary table 12 and the surface of rotation 12a is stored to the memory part 42 as the table information. The table information is obtained, for example, by measuring a reference ball 50 shown in FIG. 9 with the probe 351.

Figure 9:
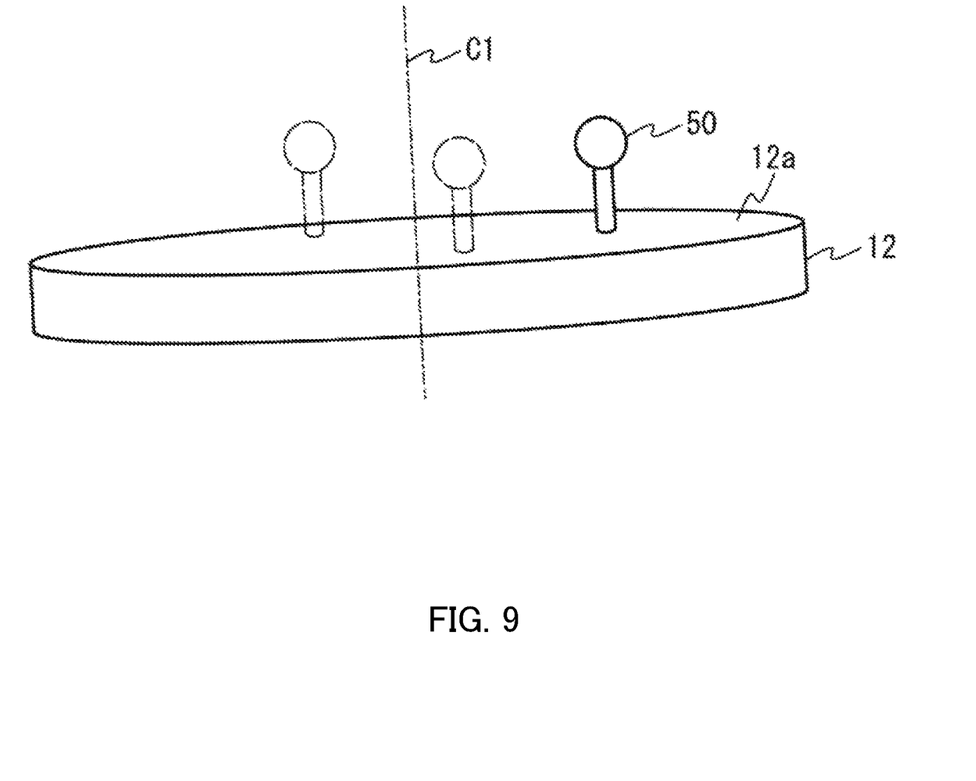
FIG. 9 is a schematic diagram for illustrating a measurement using a reference ball.

FIG. 9 is a schematic diagram for illustrating a measurement using the reference ball 50. As shown in FIG. 9, by measuring one reference ball 50 attached on the rotary table 12 with the probe 351, the inclination of the surface of rotation 12a of the rotary table 12 and the position of the rotation axis C1 can be identified. Specifically, the inclination of the surface of rotation 12a and the position of the rotation axis C1 can be identified by the probe 351 measuring the reference ball 50 at each of the three rotation positions on the rotary table 12 (in FIG. 9, the broken line shows two rotation positions on the rotary table 12). It should be noted that measurement methods are not limited to the one using the reference ball 50. For example, a plurality of reference balls may be attached on the rotary table 12 to identify the inclination of the surface of rotation 12a and the position of the rotation axis C1.

Then, the control part 44 causes the memory part 42 to store the position of the lower supporter 221 and the rotation angle of the rotary table 12 (step S104). Specifically, the control part 44 measures the position of the lower supporter 221 with the probe 351, and identifies the rotation angle of the rotary table 12 at the time when the probe 351 measured the position. Then, both pieces of information are stored to the memory part 42. Accordingly, the control part 44 can obtain the rotation track of the lower supporter 221, for example.

When the advance preparations are completed, the columnar workpiece W which is an object to be measured is set to the measurement apparatus 1 (step S106). A worker sets the columnar workpiece W so that the first end in the axial direction of the columnar workpiece W is supported by the lower supporter 221 and the second end in the axial direction of the columnar workpiece W is supported by the upper supporter 231.

Next, the control part 44 measures the upper supporter 231 with the probe 351 (step S108) and obtains a position of the upper supporter 231. The control part 44 then starts measuring the columnar workpiece W (step S110). That is, the control part 44 starts measuring, by using the probe 351, the columnar workpiece W which rotates simultaneously with the rotation of the rotary table 12 while being supported by the lower supporter 221 and the upper supporter 231

Next, upon starting the measurement, the control part 44 first obtains a rotation angle of the rotary table 12 (step S112). For example, the control part 44 obtains a rotation angle (rotation angle up to the measurement position) of the rotary table 12 based on a driving amount of a driving source which rotates the rotary table 12.

Next, the control part 44 obtains the center positions of the lower supporter 221 and the upper supporter 231 from the rotation angle obtained in step S112. Then, the control part 44 obtains a center vector connecting the center 221a of the lower supporter 221 and the center 231a of the upper supporter 231 (step S114).

Next, the control part 44 rotatably moves the workpiece coordinate axes A so that the first axis A1 of the workpiece coordinate axes A matches the obtained center vector and rotates the rotatably moved workpiece coordinate axes A in conformity with a relative rotation angle of the rotary table 12 (step S116). That is, the control part 44 rotates the workpiece coordinate axes A so that the origin is located on the rotation track of the lower supporter 221.

Next, the control part 44 converts measurement values on the X-axis, Y-axis, and Z-axis measured by the probe 351 into values on the workpiece coordinate axes and causes the memory part 42 to store the converted values (step S118). That is, the control part 44 causes the memory part 42 to store measurement correction values. With these measurement correction values, the control part 44 can obtain the coordinates and the like of the columnar workpiece W on the workpiece coordinate axes, and therefore the occurrence of measurement error can be suppressed even if the posture of the columnar workpiece W is inclined.

Then, the control part 44 repeats the above described steps S112 to S118 until the measurement of the columnar workpiece W is completed (steps S120). That is, the control part 44 can properly convert the measurement values measured by the probe 351 into the values on the workpiece coordinate axe while moving the workpiece coordinate axes according to the inclination of the columnar workpiece W during the rotation of the rotary table 12. On the other hand, if the measurement of the columnar workpiece W is completed (step S120, Yes), the worker removes the columnar workpiece W from the measurement apparatus 1 (step S122). If another columnar workpiece W is to be measured (step S124, Yes), the control part 44 returns to the above mentioned step S106 to repeat processing.

Effects of the Present Embodiment

In the above-mentioned measurement apparatus 1 of the present embodiment, the first end of the columnar workpiece W in the axial direction is supported by the lower support part 22 provided on the rotation axis of the rotary table 12 and the second end of the columnar workpiece W in the axial direction is supported by the upper support part 23. Also, the measurement apparatus 1 obtains (i) the center 221a which is a center of the lower supporter 221, (ii) the rotation track of the center 221a, and (iii) the center 231a which is the center of the upper supporter 231 when the rotary table 12 rotates, and changes the orientation of the workpiece coordinate axes A, which are three orthogonal axes including an axis passing through the centers 221a and 231a, based on the rotation position of the rotary table 12 when the measurement apparatus 1 measures the columnar workpiece W with the probe 351. For example, if the axial direction of the columnar workpiece W does not coincide with the axial direction of the rotary table 12, the rotation track viewed from the rotary table 12 of the columnar workpiece W during the rotation of the rotary table 12 would be in an inverse cone shape (refer to FIG. 4). Whereas, by changing the orientation of the workpiece coordinate axes A according to the rotation position of the rotary table 12 during the rotation of the rotary table 12 as in the present embodiment, the measurement apparatus 1 can sequentially obtain the coordinates on the workpiece coordinate axes A of the columnar workpiece W that changes orientation according to the rotation position even if the columnar workpiece W is inclined during the rotation of the rotary table 12. As a result, even if the posture of the columnar workpiece W whose two ends in the axial direction are supported by the lower support part 22 and the upper support part 23 varies during the rotation of the rotary table 12, the occurrence of measurement error when measuring the columnar workpiece W by moving the probe 351 along the X-axis direction, Y-axis direction, and Z-axis direction can be suppressed. In particular, when measuring the 3D coordinates of the elongated columnar workpiece W, the effect of suppressing the occurrence of measurement error is achieved.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A measurement apparatus comprising:
a first end supporter that is provided on a rotary table and supports a first end of a columnar workpiece in an axial direction;
a second end supporter that is separated from the rotary table and supports a second end of the columnar workpiece in the axial direction;
a probe that measures the columnar workpiece supported by the first end supporter and the second end supporter; and
a control part that obtains a center and a rotation track of the first end supporter and a center of the second end supporter when the rotary table rotates, and changes an orientation of workpiece coordinate axes based on a rotation position of the rotary table when a measurement of the columnar workpiece by the probe is performed, the workpiece coordinate axes including an axis passing through the center of the first end supporter and the center of the second end supporter.

2. The measurement apparatus according to claim 1, wherein the control part moves the workpiece coordinate axes while positioning an origin thereof on the rotation track according to the rotation position of the rotary table.

3. The measurement apparatus according to claim 1, further comprising
a memory part that stores information related to the rotation track obtained by the control part in advance, wherein the control part changes the orientation of the workpiece coordinate axes based on the rotation track stored in the memory part and the rotation position of the rotary table.

4. The measurement apparatus according to claim 1, wherein the control part changes the orientation of the workpiece coordinate axes according to the rotation position of the rotary table when the probe measures the columnar workpiece while rotating the rotary table.

5. The measurement apparatus according to claim 1, wherein the control part obtains the rotation track before the columnar workpiece is supported by the first end supporter and the second end supporter, and obtains the center of the second end supporter before the measurement of the columnar workpiece starts after the columnar workpiece is supported by the first end supporter and the second end supporter.

6. The measurement apparatus according to claim 1, wherein the control part converts measurement values of the columnar workpiece measured by the probe into values on the workpiece coordinate axes to obtain the converted values as corrected measurement values.

7. The measurement apparatus according to claim 1, wherein the second end supporter has a sphere that contacts the second end of the columnar workpiece, and a shaft part that supports the sphere and is rotatable along with the rotation of the columnar workpiece, and
the control part corrects the center of the first end supporter by measuring the sphere and the shaft part.

8. A method for measuring coordinates of a columnar workpiece, the method comprising:
rotating a rotary table in a state where a first end of the columnar workpiece in an axial direction is supported by a first end supporter provide on the rotary table and a second end of the columnar workpiece in the axial direction is supported by a second end supporter separated from the rotary table;
obtaining a center and a rotation track of the first end supporter, and a center of the second end supporter when the rotary table rotates; and
changing an orientation of workpiece coordinate axes based on a rotation position of the rotary table when a measurement of the columnar workpiece with a probe is performed, the workpiece coordinate axes including an axis passing through the center of the first end supporter and the center of the second end supporter.

9. The method for measuring the coordinates of the columnar workpiece according to claim 8, wherein the changing the orientation includes moving the workpiece coordinate axes while positioning an origin thereof on the rotation track according to the rotation position of the rotary table.

10. The method for measuring the coordinates of the columnar workpiece according to claim 8, further comprising
storing information related to the rotation track obtained in advance to a memory part, wherein the changing the orientation includes changing the orientation of the workpiece coordinate axes based on the rotation track stored in the memory part and the rotation position of the rotary table.

11. The method for measuring the coordinates of the columnar workpiece according to claim 8, wherein the changing the orientation includes changing the orientation of the workpiece coordinate axes according to the rotation position of the rotary table when the probe measures the columnar workpiece while rotating the rotary table.

12. The method for measuring the coordinate of the columnar workpiece according to claim 8, wherein the obtaining the center includes obtaining the rotation track before the columnar workpiece is supported by the first end supporter and the second end supporter, and obtaining the center of the second end supporter before the measurement of the columnar workpiece is started after the columnar workpiece is supported by the first end supporter and the second end supporter.

13. The method for measuring the coordinates of the columnar workpiece according to claim 8, further comprising:
converting measurement values of the columnar workpiece measured by the probe into values on the workpiece coordinate axes to obtain the converted values as corrected measurement values.

14. The method for measuring the coordinates of the columnar workpiece according to claim 8, wherein the obtaining the center includes correcting the center of the first end supporter by measuring a sphere that contacts the second end of the columnar workpiece of the second end supporter and a shaft part that supports the sphere and rotates along with the rotation of the columnar workpiece.

* * * * *